(12) United States Patent
Koller et al.

(10) Patent No.: US 7,599,841 B1
(45) Date of Patent: Oct. 6, 2009

(54) PERSONNEL COST PLANNING

(75) Inventors: Walter Koller, Bad Schönborn (DE);
Matthias Richter, Sinsheim (DE);
Heike Berger, Oberhausen-Rheinhausen (DE)

(73) Assignee: SAP AG, Walldorf (DE)

( * ) Notice: Subject to any disclaimer, the term of this patent is extended or adjusted under 35 U.S.C. 154(b) by 898 days.

(21) Appl. No.: 10/134,683

(22) Filed: Apr. 30, 2002

(51) Int. Cl.
*G06Q 10/00* (2006.01)
*G06Q 30/00* (2006.01)

(52) U.S. Cl. ............................... 705/1; 705/10; 705/11

(58) Field of Classification Search ............... 705/30
See application file for complete search history.

(56) References Cited

U.S. PATENT DOCUMENTS

| | | | | |
|---|---|---|---|---|
| 5,546,564 A | * | 8/1996 | Horie | 703/1 |
| 5,911,134 A | * | 6/1999 | Castonguay et al. | 705/9 |
| 5,918,207 A | * | 6/1999 | McGovern et al. | 705/1 |
| 6,012,043 A | * | 1/2000 | Albright et al. | 705/36 R |
| 6,308,166 B1 | * | 10/2001 | Breuker et al. | 705/400 |
| 6,311,164 B1 | * | 10/2001 | Ogden | 705/7 |
| 6,430,542 B1 | * | 8/2002 | Moran | 705/36 R |
| 6,526,397 B2 | * | 2/2003 | Chee et al. | 707/1 |
| 6,546,303 B1 | * | 4/2003 | Fried et al. | 700/106 |
| 6,732,079 B1 | * | 5/2004 | Kintner et al. | 705/8 |
| 6,985,872 B2 | * | 1/2006 | Benbassat et al. | 705/8 |
| 7,027,998 B2 | * | 4/2006 | Younger | 705/9 |
| 7,103,562 B2 | * | 9/2006 | Kosiba et al. | 705/10 |

* cited by examiner

*Primary Examiner*—F. Zeender
*Assistant Examiner*—Asfand M Sheikh
(74) *Attorney, Agent, or Firm*—Finnegan, Henderson, Farabow, Garrett & Dunner, LLP

(57) ABSTRACT

Computer-implemented prospective planning of personnel costs for an enterprise includes conducting planning preparation to plan the personnel costs, electronically collecting data relating to personnel costs, electronically performing a cost planning run, electronically conducting a detailed analysis of the results to revise and modify the collected data to produce updated results, and reporting the results of the cost planning run.

10 Claims, 7 Drawing Sheets

PERSONNEL COST PLANNING

TECHNICAL FIELD

This description relates to computer-implemented personnel cost planning techniques.

BACKGROUND

Competition forces companies to improve their operating business processes and react to new developments on a strategic level. Many enterprises are run in a manner that is far from being strategically optimal, and failure to strategically optimize will separate more successful enterprises from less successful enterprises in the future.

This dynamic change in the enterprise environment means that human resource ("HR") departments also face completely new tasks. For example, it is no longer sufficient to support the enterprise strategy with cost-optimized personnel management and to provide qualified employees. The future of personnel management lies in a consistent strategic orientation. In particular, HR departments must analyze and consider what part they can play in reaching enterprise goals and how they can increase the value of the enterprise. By proactively participating in the implementation of the enterprise strategy, a HR department can develop into an important link in the value chain and position itself as a consultant and partner for management and employees.

SUMMARY

Personnel cost planning may be used to deliver the relevant data for strategic planning at the highest level. The described personnel cost planning techniques allow management and personnel cost specialists to plan personnel costs based on a broad range of data. Users can access and use payroll data in the planning process along with cost-relevant data stored in infotypes (i.e., a set of data grouped according to subject matter). In addition, when planning personnel costs, the user can account for compensation-relevant data on organizational objects, such as organizational units or vacant positions. In addition to these data, which typically are already available in a human resources system, the user also can include planning data obtained directly or indirectly from line managers.

When implementing the described personnel cost planning capabilities, the user also may implement organizational management capabilities. For example, if a program for implementing the personnel cost planning capabilities is used in conjunction with a human resources management program such as mySAP Human Resources ("mySAP HR"), available from SAP, Inc. of Waldorf, Germany, the user may implement other capabilities of the human resources management program to fully exploit all the possibilities and capabilities offered by the personnel cost planning program. These other capabilities include personnel administration, payroll, training and event management, and compensation management.

In general, the described techniques support a practice-oriented, personnel cost planning process that can be used in its standard form or adjusted to suit specific needs. Part of the cost-planning process includes a cost-planning run. At the enterprise management level, the framework for the next cost-planning run is usually set once a year. During planning preparation, personnel cost planning specialists depict this framework as scenarios using a personnel cost planning program.

The next step in this process is data collection, which is also usually performed by personnel cost planning specialists using the personnel cost planning program. They first decide which employees, which organizational objects, and which cost-relevant data should be considered during planning. The planning-relevant data then is saved as cost items for each employee and each organizational object in a planning infotype.

When the data collection is completed, the personnel cost planning specialist can trigger automatic cost planning runs and simulate various scenarios. During the cost planning runs, which are run based on specifications from a customizing module and a planning preparation module of the program, additional and dependent cost items may be generated. These include, for example, increased employer contributions for insurance. In addition, personnel cost planning and the cost planning runs can account for quota planning information used by the organizational management capabilities of the program, such as future positions that are planned for individual organizational units.

The generated planning data is then available for analysis, which is presented to line managers for detail planning or to personnel cost planning specialists for additional processing. As long as a plan has not been completed, all participants can fine-tune their portion of the original plan as part of a detail planning step of the process.

When the detail planning is completed, the planning data can be presented to the company board as a basis for discussion and approval. When a plan has been approved, it can be released in the system (e.g., the company's overall planning program). The personnel planning data can then be used for cost planning in other software, such as SAP Controlling available from SAP, Inc., and/or for compensation management purposes in software such as mySAP HR. Throughout the cost planning process, the user can analyze the generated plan data, compare different plans, and compare planned cost data with actual payroll results in software packages, such as SAP Business Information Warehouse available from SAP, Inc.

In one general aspect, computer-implemented prospective planning of personnel costs for an enterprise includes conducting planning preparation to plan the personnel costs, using a computer to collect data relating to personnel costs, using a computer to perform a cost planning run, using a computer to conduct a detailed analysis of results of the cost planning run to revise and modify the collected data to produce updated results, and reporting the results of the cost planning run.

Implementations may include one or more of the following features. For example, conducting planning preparation may include creating scenarios for the enterprise and setting and inputting parameters for the scenarios. Collecting data may include collecting individual employee cost data, organizational structure data, vacant position data, and planned compensation data for jobs and positions. Collecting data may further include collecting data using a Web-based interface.

Performing a cost planning run may include specifying whether to use organizational object data only or organization object data and individual employee data in the cost planning run. Performing a cost planning run also may include; specifying whether the cost planning run is for the entire organizational structure, individual organizational units, or parts of the organizational structure; reading cost items generated during data collection and valuating cost items generated during the data collection based on planning scenario parameters; and/or generating and valuating dependent and additional cost items.

Conducting a detailed analysis may include displaying planning results; providing an interface for line managers to view and modify cost planning data; providing an interface for personnel cost planning specialists to view and modify cost planning data; saving changes to the planning data as new data records and running an updating cost planning run; setting display parameters; displaying results of the updating cost planning run; exporting the results of the updating cost planning run; and/or transferring the results of the updating cost planning run to other programs.

The computer-implemented prospective planning of personnel costs may include customizing the planning of the personnel costs for an enterprise. Customizing may include specifying one or more of (1) cost items and their assignment to symbolic accounts, statistical key figures, and cost types; (2) planning contexts; (3) planning scenario definitions; (4) settings for generating dependent and additional cost items during a planning run; (5) settings for the valuation and limitation of individual cost items according to an object's organizational attributes; (6) individual methods for collecting data on employees, organizational units, jobs, and positions; and (7) evaluation paths for planning runs.

The described programs and techniques may permit users to create and use scenarios based on different assumptions to simulate future developments. Companies also can use the generated plan data in varying ways and in other software, including within parts of mySAP.com components, such as mySAP HR and the SAP Controlling component of SAP R/3, which is available from SAP, Inc. As such, the described programs and techniques may be offered as part of an integrated solution for personnel cost planning. The described programs and techniques may permit personnel cost planners to support strategic personnel management and the overall enterprise strategy, simulate future developments based on various scenarios with different assumptions, analyze the effects of headcount changes, for example, in terms of costs or savings, make comparisons between planned and actual scenarios to allow continuous monitoring of planning, and quickly recognize deviations so that management can take prompt counter-measures.

The details of one or more implementations are set forth in the accompanying drawings and the description below. Other features will be apparent from the description, the drawings, and the claims.

DESCRIPTION OF DRAWINGS

Like reference symbols in the various drawings indicate like elements.

DETAILED DESCRIPTION

HR can play a number of roles in the enterprise strategy of a company. These roles include reliable cost planning, new recruitment processes, developing compensation models that are internationally recognized and comparable, and introducing up-to-the-minute systems for personnel management, communication, and analysis. One implementation of software that may be used to assist HR in performing one or more of these roles is an integrated, e-business software solution that offers complex evaluation, analysis and simulation options. This software solution may be used to help enterprises of all industry sectors analyze their workforces, implement strategic management techniques, and achieve their strategic goals. It includes personnel cost planning and integrated headcount planning capabilities.

In general, using the personnel cost planning and simulation capabilities of the software, personnel cost planning specialists can support both strategic personnel management and overall enterprise strategy. The software is designed so that the personnel cost planning specialists can use scenarios based on different assumptions to simulate future developments within the enterprise, such as increased hiring in response to changing conditions in the marketplace. The personnel cost planning specialists then can analyze the consequences that those changes or developments may have on personnel costs and the enterprise. Headcount changes are reflected immediately in related costs or savings, and planned-actual comparisons allow personnel cost planning specialists to continuously monitor planning so that they can promptly recognize deviations and take suitable measures. The personnel cost planning specialists also can simulate new compensation models and analyze their effects in detail.

Figure 1:
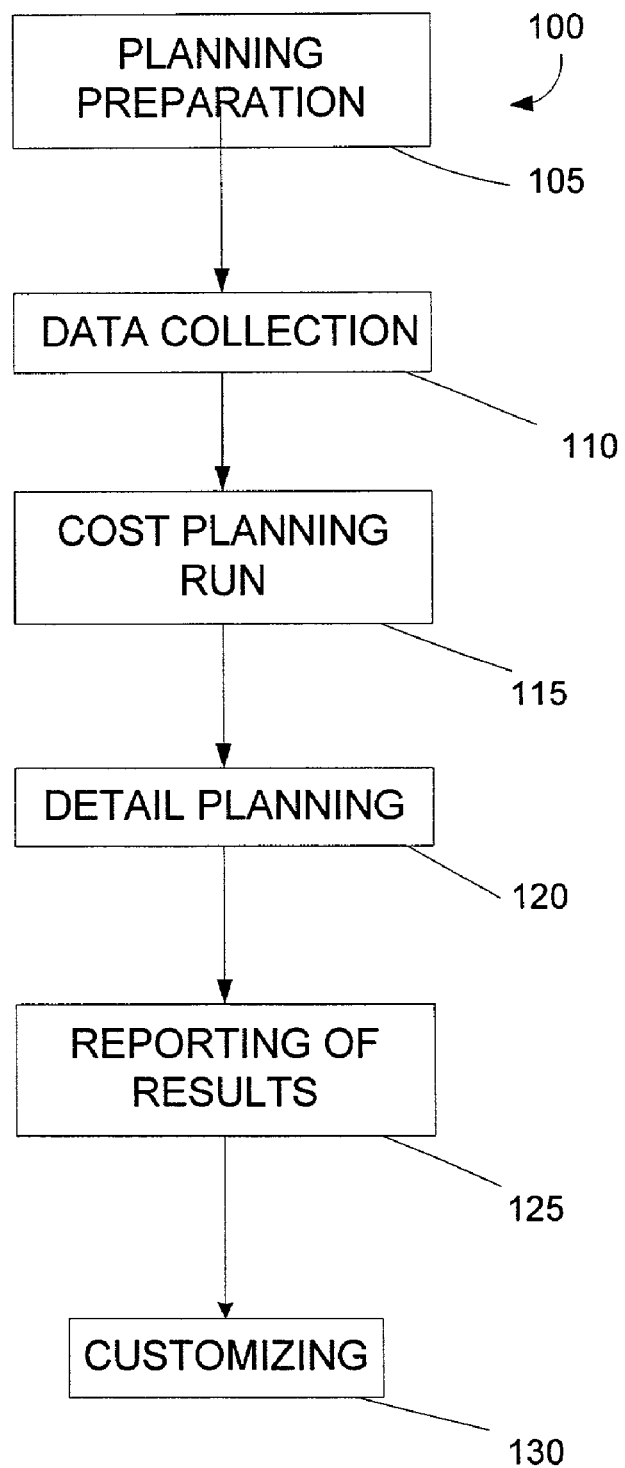
FIG. 1 is a flow chart illustrating a personnel cost planning and simulation program.

Referring to FIG. 1, a personnel cost planning and simulation program 100 includes a planning preparation module 105, a data collection module 110, a cost planning run module 115, a detail planning module 120, a results reporting module 125; and a customizing module 130. The program 100 can be implemented as hardware or software on a computer or otherwise as a system.

Figure 2:
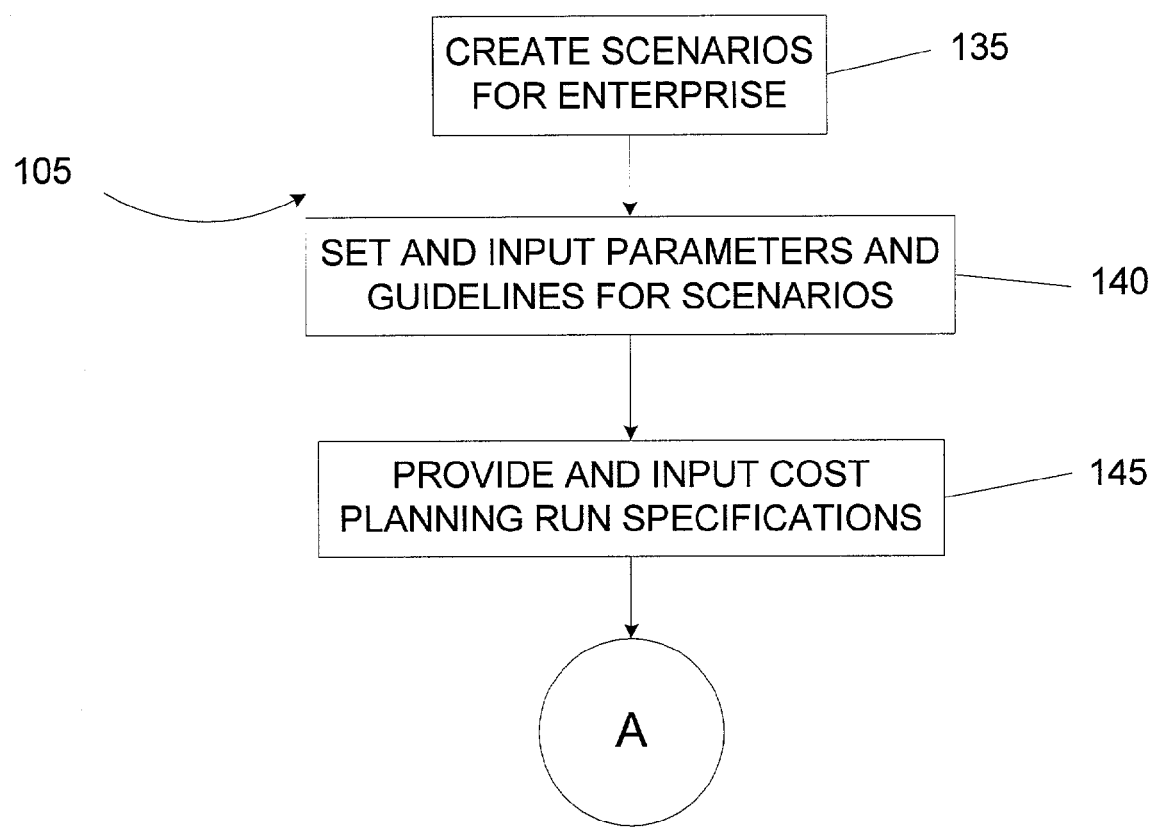
FIG. 2 is a flow chart illustrating a planning preparation module of the personnel cost planning and simulation program of FIG. 1.

Referring also to FIG. 2, the planning preparation module 105 permits the personnel cost planning specialists to perform a series of steps that begin with creating cost-planning scenarios (step 135). At the enterprise management level, the framework for cost planning runs is usually set once a year. During the planning preparation phase, personnel cost planning specialists depict this framework as scenarios. For example, through the personnel cost planning specialists, the enterprise can create and set various planning scenarios so that they execute cost planning runs, described below, with different assumptions and compare the effects of different measures.

The scenarios may include parameters, guidelines, and rules that the personnel cost planning specialists provide to the program (step 140). In one implementation, the personnel cost planning specialists set parameters and guidelines for a worst case scenario and a standard scenario. Examples of parameters that can be set for a worst case scenario are those based on an unusual increase in overtime and/or an unexpected increase in health care costs. The parameters for a standard scenario can be set, for example, to the values from the prior fiscal or planning year.

During the planning preparation phase, the personnel cost planning specialist also provides the cost planning run specifications and inputs them into the program 100 (step 145). The cost planning run specifications may include, for example, cost items and their assignment to symbolic accounts, statistical key figures, and cost type; planning contexts; planning scenarios definitions; settings for generating dependent and additional cost items during a planning run; settings for the valuation and limitation of individual cost items according to an object's organizational attributes; an enterprise's methods for collecting data on employees, organizational units, jobs, and positions; and evaluation paths for planning runs. These specifications are added to those specifications already provided within the customizing module 130, which is described in greater detail below.

Figure 3:
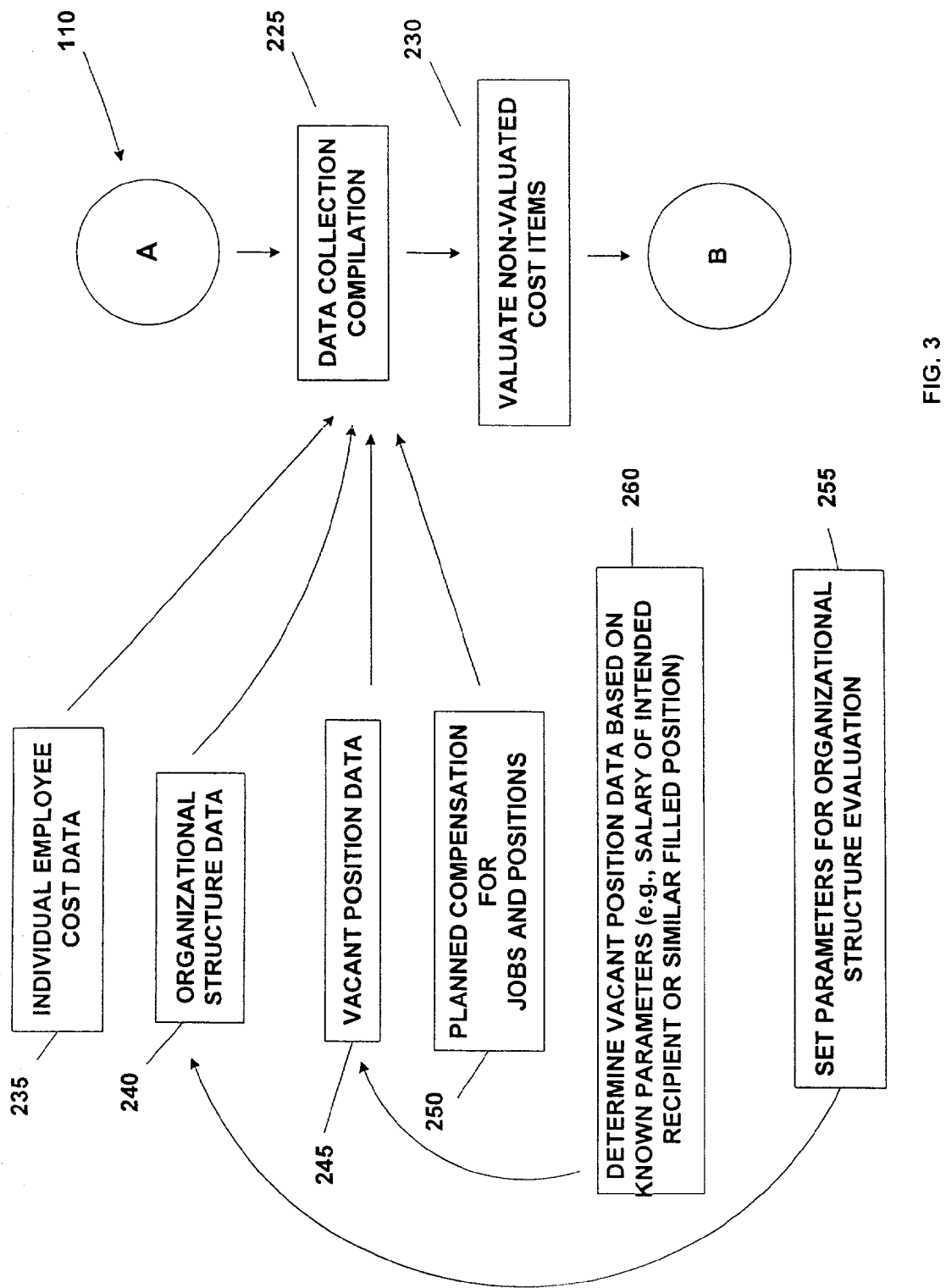
FIG. 3 is a flow chart illustrating a data collection module of the personnel cost planning and simulation program of FIG. 1.
Figure 4:
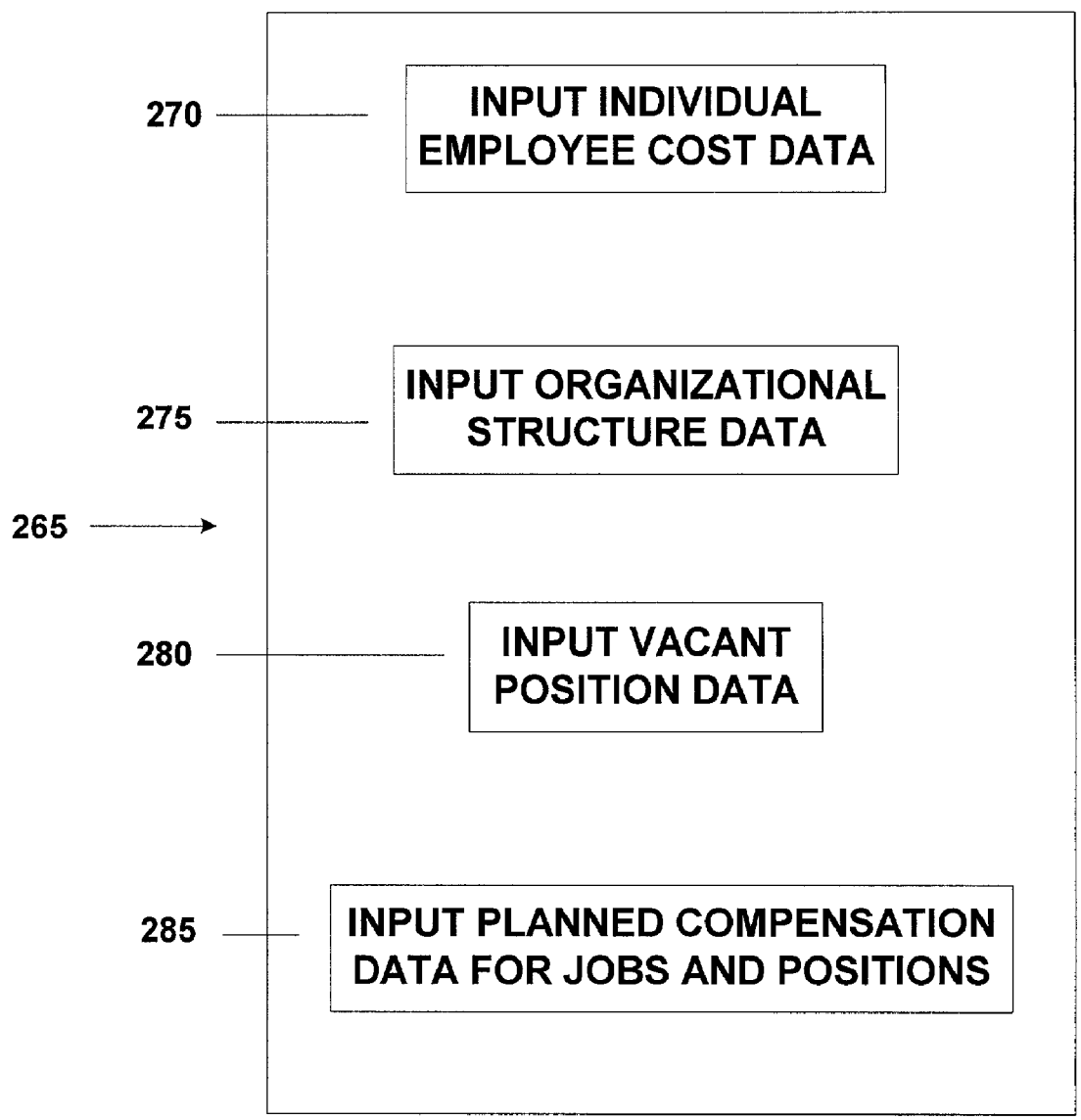
FIG. 4 is a block diagram of one implementation for inputting data to the data collection module of FIG. 3.

Referring to FIGS. 3 and 4, the data collection module 110 receives data from a single source or multiple sources and uses that data in the planning run in a series of steps or operations that includes data collection compilation (step 225) and valuation of non-valuated cost items (step 230). When preparing a planning run, the personnel cost planning specialist specifies which data is to be used for personnel cost planning and makes that data available as a data basis. Various types of information can be used when planning. In general, the type of data and information used can be divided into: (1) cost and amount data for individual employees; (2) cost and amount data for organizational objects, such as expected costs for currently vacant positions; (3) aggregated values at the organizational unit level, such as training budgets; and (4) positions that were planned in quota planning using the organizational management capabilities of the personnel cost planning and simulation program 100.

Data on individual employees typically is collected before data on organizational objects because the personnel cost planning specialist can use the individual employee data to generate the organizational object data. For example, the cost planning specialist can use the employee data to calculate the average salary for a particular job, which is then entered as a cost variable for a vacant position.

To obtain this data (i.e., the employee data, the organizational object data, and the position data), the personnel cost planning specialist can optionally implement a customized data collection method for use in, for example, data collection from customer-specific infotypes. One method of implementing a customized data collection method is to use SAP's Business Add-In (BAdl) technology, available from SAP, Inc. of Waldorf, Germany.

In whatever method of collecting data that is used, the personnel cost planning specialist collects the data from, for example, line managers, the human resources department, paper records within the company, and/or personnel cost planning infotypes stored electronically. Collecting the employee data from personnel cost planning infotypes advantageously allows the cost planning specialist to see the data displayed in a familiar, or even the same format, as other human resources data. The personnel cost planning specialist can collect data from, for example, employee basic pay infotypes, capital formation infotypes, recurring payments and deductions infotypes, additional payments infotypes, one-time payments off-cycle infotypes, pay scale reclassifications (simulated or infotypes), payroll results (actual, simulated, or infotypes), and training and event management data infotypes. Because of potential privacy concerns, the program 100 can include an authorization check to permit access by specified people to the personnel cost planning data.

The cost planning data used for the organizational objects, namely, the organizational units, jobs, and positions is collected from cost planning infotypes. The data can be obtained: (1) from the organizational structure; (2) from information on vacant positions; and (3) from planned compensation infotypes. For example, the personnel cost planning specialist can specify how the organizational structure should be evaluated and for which organizational objects the data should be stored. Vacant position data can be based, for example, on the known salary of an employee who is the future holder of a position. The planned compensation data can be retrieved from data stored in the system for jobs and positions. Moreover, the cost planning data generated for jobs can be country specific so that the personnel cost planning specialist can save different values for the job of, for example, developers in different countries. If necessary or desired, the personnel cost planning specialist can implement customized methods to obtain data.

More specifically, as illustrated in FIG. 3, the data collection compilation (step 225) can be based on data received for: individual employee cost data (step 235), organizational structure data (step 240), vacant position data (step 245), and planned compensation data for jobs and positions (step 250). This data is gathered and input into the program using common data entry techniques. The organizational structure data (step 240) is based at least in part on parameters that are set for evaluating the organizational structure (step 255). The vacant position data (step 245) may be based on values derived from known parameters, such as the salary of the intended job recipient or the salary of a similar, filled position (step 260).

The data collection module 110 can be implemented as a Web-based interface 265 such that line managers can access the data collection module 110 and input data specific to their direct employees. The web page 265 includes a first input link 270 for a screen for inputting individual employee cost data, a second input link 275 for a screen for inputting organization structure data, a third input link 280 for a screen for inputting vacant position data, and a fourth input link 285 for inputting planned compensation data for jobs and positions. The first input link 270 opens to a screen that includes fields for inputting individual employee cost data, such as hourly wage, overtime rate, and number of vacation days allocated per year. The second input link 275 opens to a screen that includes fields for inputting organizational structure data, such as number of employees reporting to the line manager, number of part-time positions anticipated for the upcoming year, and anticipated head count reductions. The third input link 280 opens to a screen that includes fields for inputting vacant position data, such as number of vacant positions to be filled, hourly wage or yearly salary, and overtime rate. The fourth input link 285 opens to a screen that includes fields for inputting planned compensation data, such as planned bonuses, employee incentives, and raises.

As noted above, a worst case scenario and a standard case scenario may be used in the system 100. As such, when inputting the cost data, organizational structure data, vacant position data, and planned compensation data, the line manager may be asked to specify the data for a worst case scenario and a standard case scenario. By taking the data collection to the line manager level, the data collection process is decentralized, which is believed to improve the quality of the data received and used. This method of data collection also relieves the human resources personnel of the time-consuming efforts of obtaining all of the data.

The cost data that is collected includes cost items, which are considered to be a fundamental element of personnel cost planning with the program 100 and form a basis for planning and simulation. During the data collection, direct cost items, such as, for example, an employee's base monthly salary, are written to the respective cost objects in the personnel cost planning infotype according to the data collection method used. During the planning run, described below, dependent and additional cost items, such as, for example, the employer contribution to health insurance, are generated according to the specifications provided in the customizing module and the planning preparation module.

Cost items for personnel cost planning can be monetary amounts or quantities. Direct cost items are usually already valuated after data collection. For example, "$5,000 per month base salary" is an amount and, therefore, a valuated cost item. On the other hand, "eight overtime hours per month" is a quantity and a non-valuated cost item that is valuated during the planning run. Set limits are used to ensure that certain specified cost items cannot exceed or fall below certain fixed values.

The cost planning specialist also can specify set limits for each scenario. These limits ensure that fixed upper or lower limits are maintained for certain cost items during the planning run. For example, the cost planning specialist can specify a set limit for pay raises of 3% over the time period encompassed by the planning run. Depending on the organizational attributes of the cost object, the set limits can be at different levels for each cost item. The cost planning specialist can provide an authorization for line managers to specify or modify set limits for the scenarios to the extent that the set limits are within the job responsibility or expertise of the particular line manager. For example, one line manager may have a staff that has lagged behind the majority of the enterprise with respect to pay raises. As such, the cost planning specialist can provide authorization for that line manager to permit a pay raise for that line manager's staff for a value greater than the 3% set by the cost planning specialist for the enterprise. The personnel cost planning and simulation program 100 includes interfaces that permit these specifications to be quickly and easily changed during planning so as to, for example, account for new specifications. For example, the cost planning specialist may specify an enterprise average pay raise of 3% but, because of improved economic conditions, upper management may determine that, for example, a 3.7% pay raise is warranted.

After the cost data is entered using, for example, the interface 265, limits are set and the data is compiled (step 225). For example, compiling the cost data may include transferring the data from the input links accessed by the line manager to a database of the personnel cost planning and simulation program 100.

With the cost data inputted and compiled, the personnel cost planning and simulation program 100 next determines the valuation of non-valuated cost items (step 230). Depending on the organizational attributes of a cost object, the cost planning specialist and/or line manager can specify different valuations for different cost items, such as, for example, different premiums for different groups of employees.

Figure 5:
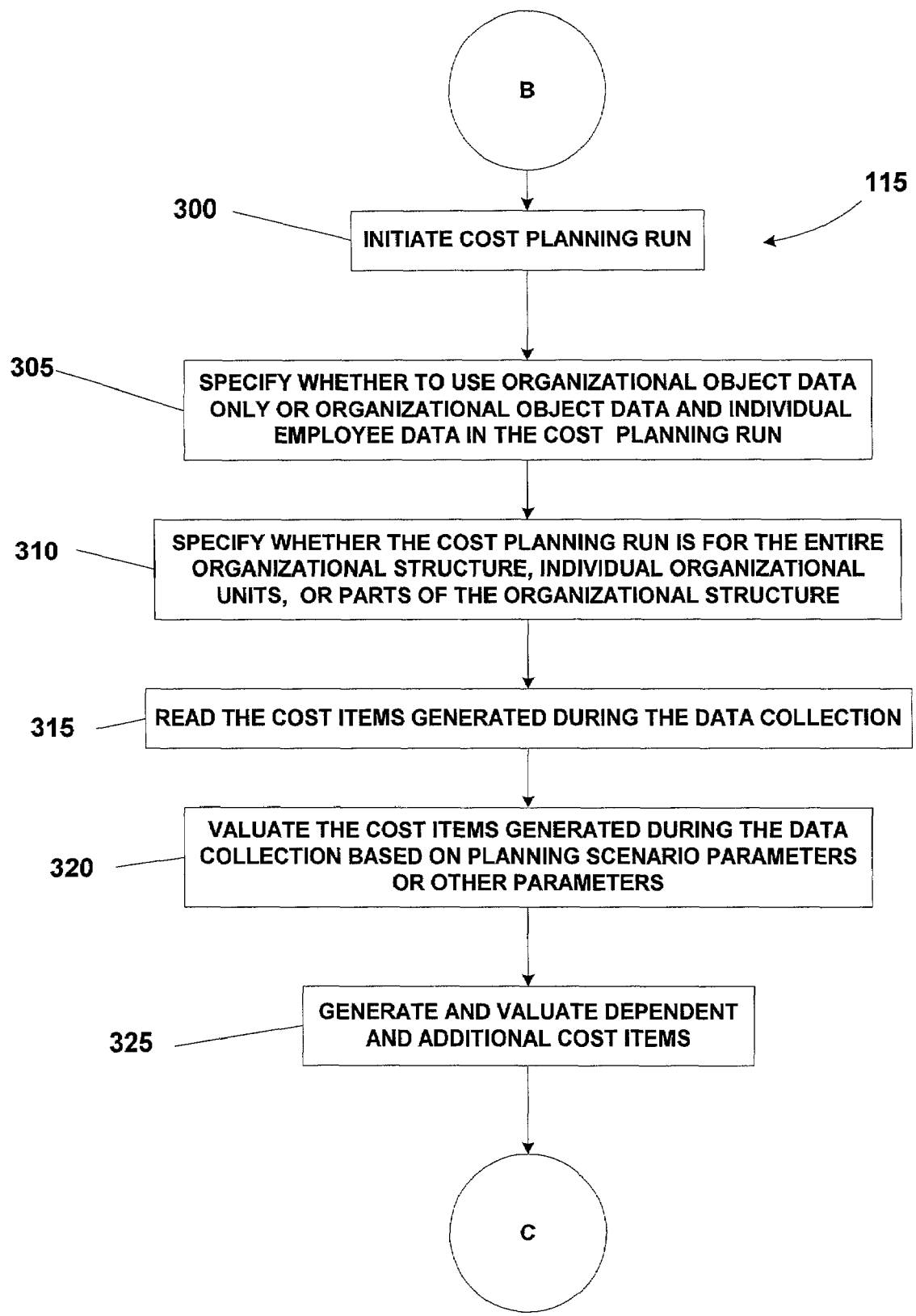
FIG. 5 is a flow chart illustrating a cost planning run module of the personnel cost planning and simulation program of FIG. 1.

Referring to FIG. 5, the cost planning specialist performs the cost planning runs after all the direct cost items for employees and organizational objects have been collected and written to planning infotypes. During the run, the program 100 reads the cost items generated during data collection and, if necessary, valuates them according to the planning scenario. At the same time, the program 100 generates the dependent and additional cost items and also valuates them. Additional cost planning data runs can be initiated for additional planning scenarios. The personnel cost planning specialist also can enter responsibilities and completion dates for the individual planning runs and select a cost planning method.

In the cost planning run module illustrated in FIG. 5, the personnel cost planning specialist initiates the cost planning run (step 300). The personnel cost planning specialist then is prompted to specify whether to use organizational object data only or organization object data and individual employee data in the cost planning run (step 305). The cost planning specialist then is prompted to specify whether the cost planning run is for the entire organizational structure, for the individual units, or for parts of the organizational structure (step 310). The cost planning run module 115 then reads the cost items generated using the data collection module 110 (step 315). The cost planning run module 115 then valuates the cost items generated during the data collection, for example, based on the planning scenario parameters or other parameters (step 320). Finally, to conclude the cost planning run, the module 115 generates and valuates dependent and additional cost items (step 325).

Detail planning 120 is performed after the cost planning run and allows the line managers and personnel cost planning specialists to review and revise various cost items. The automatically-generated planning results of the cost planning run 115 are presented to the line managers and the personnel cost planning specialists using a Web-based interface. The detail planning is set up to be handled intuitively. As such, to the extent that line managers are involved in the detail planning, this activity, which they do not often perform, can be completed quickly and easily.

In general, during detail planning, the line managers have access to the cost planning data for employees, organizational units, jobs, and positions in their respective areas of responsibility, while the personnel cost planning specialists have access to all cost planning data. In the detail planning module 120, the user (e.g., personnel cost planning specialist or line manager) can access (1) the change cost items function; (2) the add cost items function; (3) the delete cost items function; (4) the simulate pay scale reclassifications for employees, positions, and jobs function; (5) the change workforce requirements planning function; and (6) the change staffing percentage function. Using authorizations within the program 100, the personnel cost planning specialist, or management at a higher level, can specifically set access restrictions to these functions. The changes made in detail planning are saved as new data records to retain the original plan data. This means that personnel cost planning specialists can easily track the changes made by line managers.

Figure 6:
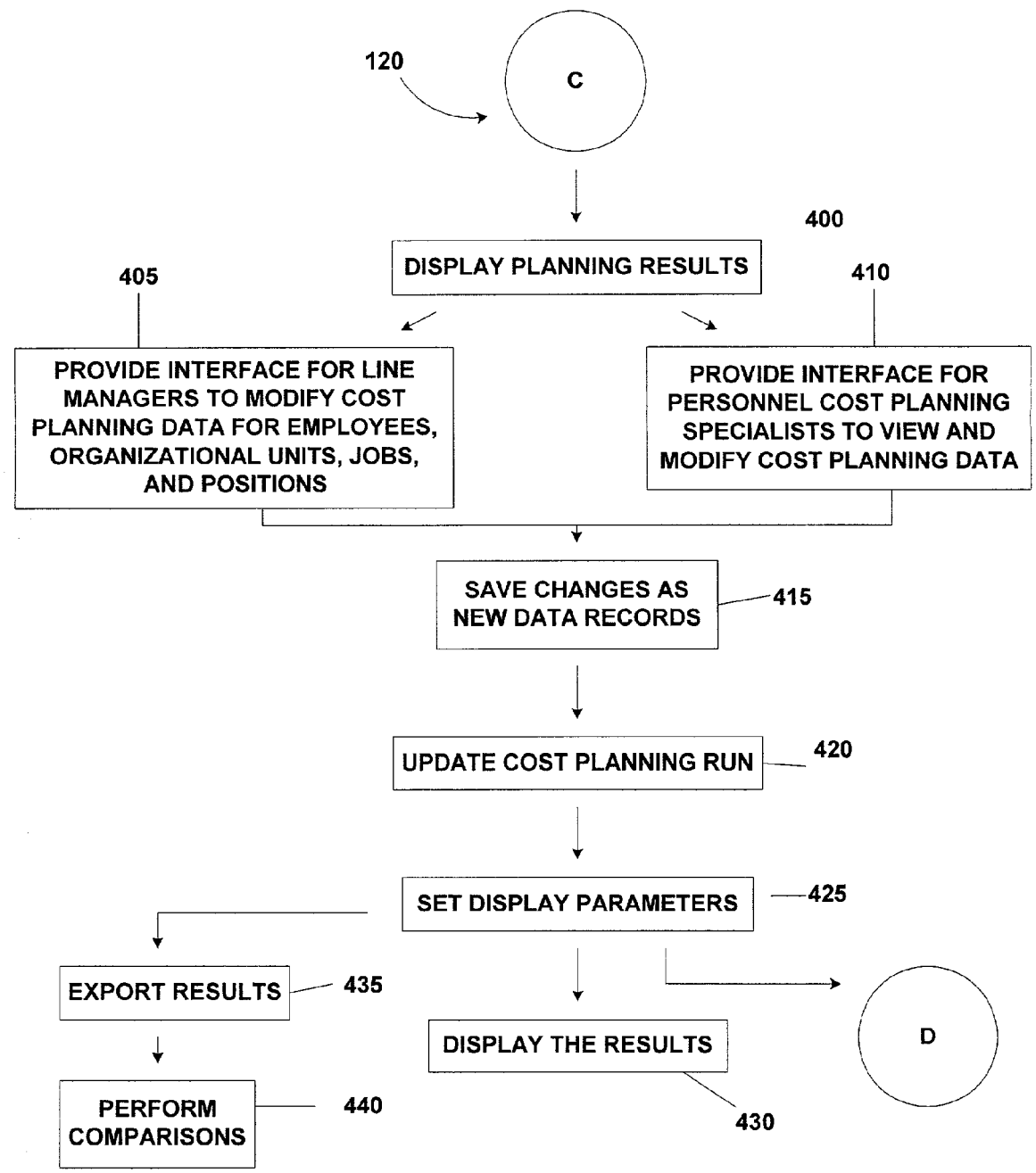
FIG. 6 is a flow chart illustrating a detail planning module and reporting module of the personnel cost planning and simulation program of FIG. 1.

FIG. 6 illustrates a detail planning module 120 that displays the planning results obtaining from the cost planning run module 115 in a web-based interface (step 400). This display format enables cost planning specialists, line managers, and upper management to access and view the results to conduct detail planning such as, for example, reviewing the results, analyzing the results, and/or checking the results for accuracy and consistency. For example, planning results can be displayed such that the only planning results that are displayed are those planning results for the organizational units, job, positions, and employees for which a particular line manager is responsible. The interface permits a line manager to view and modify the cost planning data and results for the line manager's organizational units, job, positions, and employees (step 405). Similarly, the interface displays the planning results such that the personnel cost planning specialist can view and modify cost planning data and results for the entire organization (step 410). After modification, the data is saved as new data records such that the original plan data is retained (step 415). This allows, for example, the personnel cost planning specialist to easily track the changes made by the line managers. After the data has been modified and saved, an updating cost planning run is performed (step 420). The updating cost planning run 420 can merely update the values related to those fields that have been modified or can update all of the values for the entire organization.

The updating cost planning run 420 updates the results and then reports the updated results. The results are reported in one of several formats based on display parameters that are selected and set (step 425). For example, the data can be processed and displayed based on parameters associated with filter, total and subtotal, and sorting functions. Similarly, by setting other parameters, the data can be displayed in-place in Excel and/or Crystal reports, or in a user-specified, customized layout. The results then are displayed (step 430). In place of, or simultaneously with, the display of the results, the personnel cost planning specialist can set other parameters to export the results to a word processing program, a spread sheet, or another program, such as SAP Business Information Warehouse or SAP Controlling (step 435). SAP Business Information Warehouse can then be used to answer questions that go beyond the functions described above (i.e., filtering, sorting, totals and subtotals) (step 440). For example, SAP Business Information Warehouse includes a special personnel cost planning InfoCube and a set of queries with which the cost planning specialist can further analyze the planning data in detail. Examples of the queries available include: (1) comparison of personnel cost planning and actual payroll data; (2) comparison of two plans; and (3) comparison of planned versus actual headcount.

Figure 7:
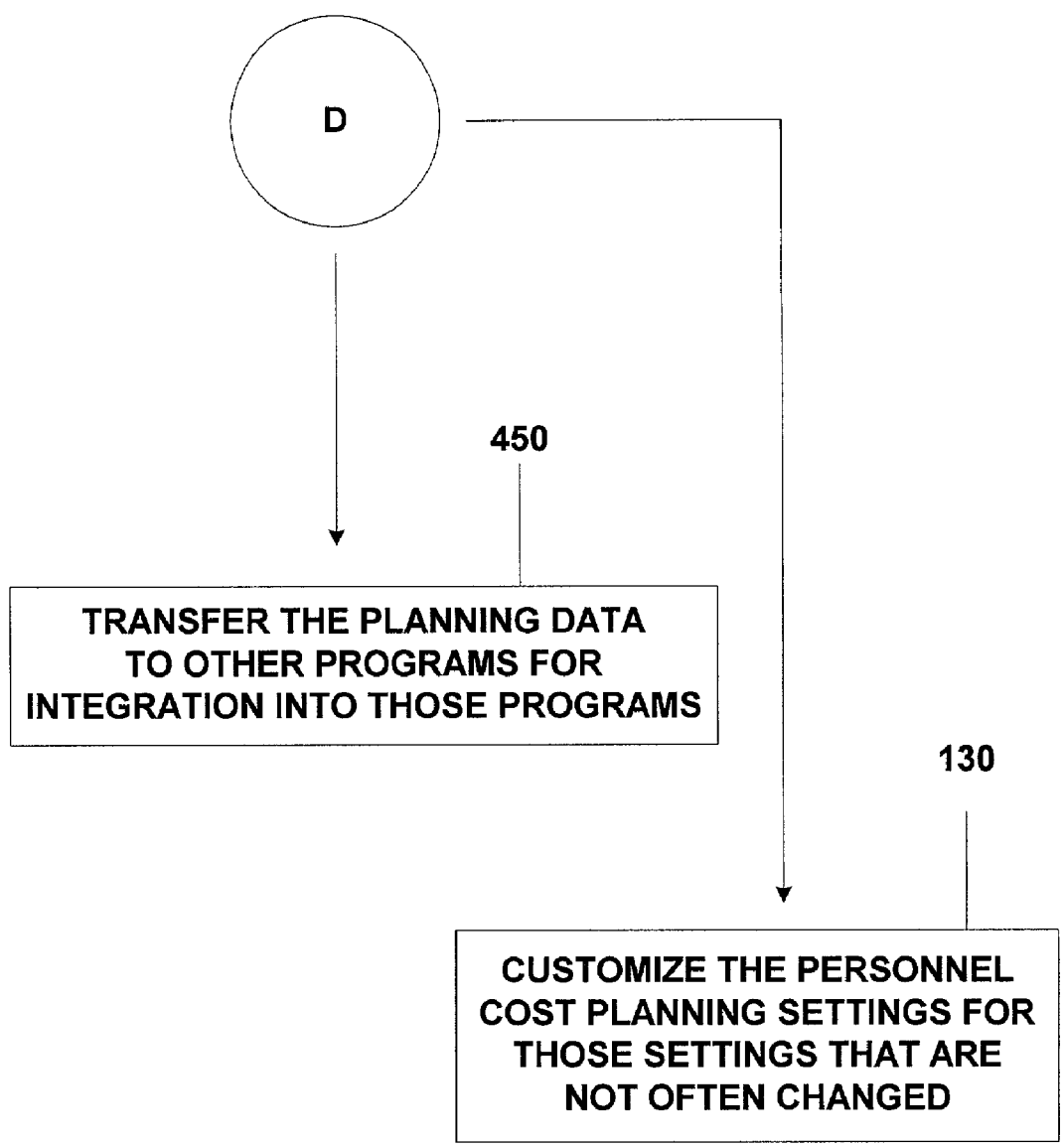
FIG. 7 is a flow chart illustrating a customizing module of the personnel cost planning and simulation program of FIG. 1.

Referring to FIG. 7, although the results can be exported to programs such as SAP Business Information Warehouse and SAP Controlling, the results also can be integrated into other programs, including SAP Business Information Warehouse and SAP Controlling (step 450). Once the results have been integrated into another program, the personnel cost planning specialist can compare plans. The cost planning specialist also can simulate the data transfer before actually posting the data to the other program, and can use check algorithms to ensure that defective data is not transferred. The personnel cost data can be integrated into another program (e.g., SAP Controlling) and used for overall enterprise planning. For example, the personnel cost planning can be used to determine the anticipated personnel costs for the next fiscal year and determine how many people can be hired and maintain profitability.

If the program 100 is implemented as a component of a larger program, such as my SAP Human Resources, the cost planning specialist can integrate the planning data with the larger program to generate compensation budgets using compensation management capabilities of the program as well as training budgets using the training and event management capabilities of the program.

The personnel cost planning data can be customized for using the customizing module 130 of the program 100. According to a cost planning specialist's needs, or the needs of the enterprise, the cost planning specialist can specify certain settings for personnel cost planning data that is not often changed. For example, the following specifications are stored in the customizing module and can be changed: (1) cost items and their assignment to symbolic accounts, statistical key figures, and cost types; (2) planning contexts; (3) planning scenario definitions; (4) settings for generating dependent and additional cost items during a planning run; (5) settings for the valuation and limitation of individual cost items according to an object's organizational attributes; (6) individual methods for collecting data on employees, organizational units, jobs, and positions; and (7) evaluation paths for planning runs in the program 100. With respect to the planning context specification, the program 100 can be implemented with one planning context and the personnel cost planning specialist can create a customized planning context to vary cost item behavior.

A number of implementations have been described. Nevertheless, it will be understood that various modifications may be made. For example, the program 100 can be implemented as a user-friendly Web application for managers to decentralize some of the planning and make line managers more aware of costs.

The program 100 also can be used to generate budgets in separate or related software, such as mySAP Human Resources and SAP Controlling, both of which are available from SAP, Inc. of Waldorf, Germany. By transferring data between programs or otherwise linking them, the cost planning specialist can use the program 100 to streamline an organization's internal processes and increase their effectiveness.

The program also can be implemented with an integrated on-line survey that may be sent, for example, to line managers to allow the cost planning specialist to collect personnel planning data immediately before a cost planning run. This type of survey would thereby result in getting the data from the people who actually perform operative planning. With an on-line survey, a line manager receives a questionnaire in which the line manager enters planning data for the upcoming planning period. For example, an on-line survey may contain a list of the employees for which a manager is responsible. It also may contain information on the jobs that are used in a particular area. The line manager may enter planned or anticipated overtime for each employee and headcount changes for each job. In this manner, the on-line survey data flows into the collection of both employee data and organizational object data. Although the program may be provided with a set on-line survey, appropriate customizing allows the personnel cost planning specialist to create customized on-line surveys to ask line managers for the relevant data during each planning round.

The program may be implemented with on-line surveys and detail planning as on-line applications in a portal specially devised for managers to enable those responsible to perform their personnel cost planning tasks in a familiar environment, without needing to switch systems or interfaces. Intuitive handling and an underlying workflow considerably increases the acceptance of such surveys. The time used for planning on paper, which is still common, would be greatly reduced.

Other implementations are within the scope of the following claims.

What is claimed is:

1. A computer-implemented method of prospectively planning personnel costs for an enterprise, the computer including a processor and memory and the method comprising steps performed by the computer of:

conducting planning preparation, by the processor, to plan the personnel costs, wherein the planning preparation comprises creating more than one scenario for the enterprise and setting different scenario parameters for each of the more than one scenario, wherein the different scenario parameters include a standard case scenario and a worst case scenario;

specifying, by the processor, a limit for each of the more than one scenario;

modifying, by the processor, the limit during the planning preparation when the personnel costs change;

collecting data, by the processor and based on the limit and in a decentralized manner, including direct cost items and dependent cost items that relate to the personnel costs, using a computer;

performing, by the processor, a cost planning run using the computer, wherein performing the cost planning run comprises valuating the collected cost items based on the more than one scenario and the different scenario parameters;

valuating, by the processor, the direct cost items and the dependent cost items, wherein the direct cost items are valuated before the dependent cost items;

conducting, by the processor, a detailed analysis of results of the cost planning run;

revising, by the processor, the collected data to produce updated results based on the detailed analysis; and reporting, by the processor, the updated results, wherein the direct cost items are written to a cost object and the dependent cost items are generated according to a customizing module and a planning preparation module.

2. The computer-implemented method of claim 1 wherein conducting planning preparation comprises creating scenarios for the enterprise.

3. The computer, implemented method of claim 2 wherein conducting planning preparation further comprises setting and inputting parameters for the scenarios.

4. The computer-implemented method of claim 1 wherein collecting data comprises collecting individual employee cost data.

5. The computer-implemented method of claim 1 wherein conducting a detailed analysis comprises displaying the results of the cost planning run.

6. The computer-implemented method of claim 5 wherein conducting a detailed analysis further comprises one or both of providing an interface for line managers to view and modify cost planning data and providing an interface for personnel cost planning specialists to view and modify cost planning data.

7. The computer-implemented method of claim 6 wherein conducting a detailed analysis further comprises saving changes to the cost planning data as new data records and running an updating cost planning run.

8. The computer-implemented method of claim 7 wherein conducting a detailed analysis further comprises setting display parameters.

9. The computer-implemented method of claim 8 wherein conducting a detailed analysis further comprises one or more of displaying results of the updating cost planning run, exporting the results of the updating cost planning run, and transferring the results of the updating cost planning run to other programs.

10. The method of claim 1, wherein performing the cost planning run using the computer further comprises specifying whether to use organizational object data only or organization object data and individual employee data in the cost planning run.

* * * * *

UNITED STATES PATENT AND TRADEMARK OFFICE
CERTIFICATE OF CORRECTION

| | | |
|---|---|---|
| PATENT NO. | : 7,599,841 B1 | Page 1 of 1 |
| APPLICATION NO. | : 10/134683 | |
| DATED | : October 6, 2009 | |
| INVENTOR(S) | : Koller et al. | |

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 898 days Delete the phrase "by 898 days" and insert -- by 1254 days --

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,599,841 B1 |
| APPLICATION NO. | : 10/134683 |
| DATED | : October 6, 2009 |
| INVENTOR(S) | : Koller et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1610 days.

Signed and Sealed this

Twenty-eighth Day of September, 2010

David J. Kappos
*Director of the United States Patent and Trademark Office*